Patented Aug. 13, 1929.

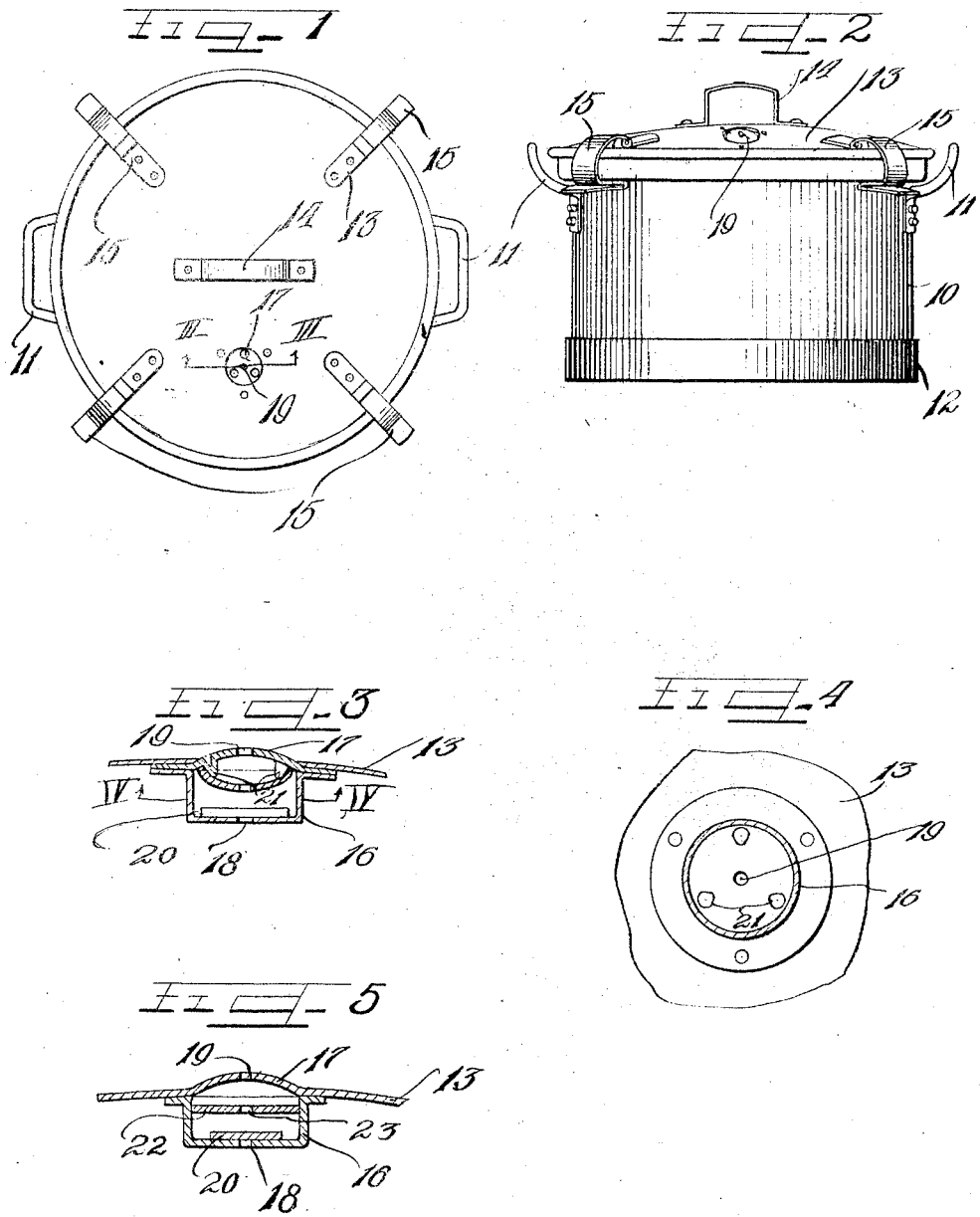

1,724,101

UNITED STATES PATENT OFFICE.

ELMER P. McCLURE, OF WESTERN SPRINGS, ILLINOIS, ASSIGNOR TO ALUMINUM PRODUCTS COMPANY, A CORPORATION OF ILLINOIS.

WATERLESS COOKER.

Original application filed January 28, 1926, Serial No. 84,271. Divided and this application filed September 20, 1926. Serial No. 136,416.

The invention relates to cooking utensils known in the art as waterless cookers.

In the use of cookers of this type heretofore used, the food to be cooked is placed within the cooker and the top or cover is securely held to the vessel, more or less steam-tight, and a relatively small vent is made through the cover from which vapor or steam constantly escapes during the cooking process, the interior of the vessel being at substantially atmospheric pressure or a very little above it.

Applicant has found that for practical purposes, to retain all of the desirable savor of the food being cooked, it is best to seal the vessel against a few ounces internal pressure above atmospheric pressure, and for purposes of economy, to provide alarm means operable when the internal pressure exceeds that at which it is desirable to be maintained so that the heat applied to the vessel may be reduced until the alarm becomes less frequent or ceases altogether.

This application is a division of my copending application Serial No. 84,271, filed January 28, 1926.

On the drawings:

Figure 1 is a plan view of a cooker embodying the present invention.

Figure 2 is a side elevation thereof.

Figure 3 is an enlarged fragmentary section taken on line III—III of Figure 1.

Figure 4 is a transverse section taken on line IV—IV of Figure 3.

Figure 5 is a modification of Figure 3.

In all of the views the same reference characters indicate similar parts.

Food is more nourishing and possesses a better flavor when cooked at a uniformly low temperature.

The cooker body 10 is provided with side handles 11 and rests upon a separable heat distributing base plate 12. The cover has a handle 14 by which it may be lifted and it is yieldingly held in contact with the open end of the vessel by spring clamps 15.

A small casing 16 is attached to the under side of the cover 13 under an outwardly bulged part 17 which is shown in Fig. 3 to be a part of the cover. The floor wall of the casing 16 is perforated at 18 to provide a vent in connection with the perforation 19 when the weight 20 is removed from its normal position covering the port 18. The smallness of the hole or port 18, with the weight of the disk 20 requires several ounces pressure within the cooker 10 before the latter will be vented by very slightly lifting the disk 20, thus opening the ports 18 and 19. When this is done the vapor passing through these small openings around the weighted disk produces a sharp whistling sound.

It is then the duty of the cook to carefully reduce the intensity of the flame to an extent that the pressure is very nearly but not quite sufficient to raise the weighted valve 20.

The weight 20 is only very slightly raised in operation and it is only when the pressure holds it open continuously that the whistling sound is made. In use, the weight should be raised intermittently, in which event the velocity of the escaping vapor is not sufficient to blow the whistle and there is sufficient moisture within the vessel. The device is a combined automatic relief valve and whistle.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A combined safety valve and whistle for a cooking utensil, including a casing having two separated walls, each having a small vent perforation and a weighted disk in said casing overlying another perforation and normally closing it.

2. A combined safety valve and whistle for a cooking utensil, including a casing having two separated walls, each wall having a relatively small perforation, another wall having a perforation and a weighted disk in said casing normally closing the last mentioned perforation, said first named perforations arranged to cause escaping vapor to produce a whistling sound when the lower perforation is uncovered.

3. A combined safety valve and whistle for a cooking utensil, comprising a closed casing having three separated walls, each wall having a perforation, a disk normally closing the lower perforation and adapted to be lifted by pressure, said casing having its upper walls spaced away from one another, and said upper walls being perforated whereby to produce a whistling alarm sound when the disk is raised and all perforations are open.

4. A combined safety valve and whistle including a casing having means at its upper portion to produce a whistling sound upon the passage of vapor therethrough and having a lower perforated wall, and a weighted disk in said casing to normally overlie the perforation of said lower wall in order to prevent the passage of vapors therethrough.

5. A combined safety valve and whistle including a casing having a series of perforated walls and a weighted disk movable in the casing, the perforations of certain of said walls being arranged to produce a whistling sound upon the escape of vapors, and a disk normally covering the perforation of another wall to prevent such escape of vapors.

In testimony whereof I have hereunto subscribed my name.

ELMER P. McCLURE.